United States Patent
Capoulun et al.

(10) Patent No.: US 10,298,085 B2
(45) Date of Patent: May 21, 2019

(54) MOTOR SUPPORT UNIT AND HEATING, VENTILATION AND/OR AIR CONDITIONING INSTALLATION FOR A CORRESPONDING MOTOR VEHICLE

(71) Applicant: Valeo Systemes Thermiques, Le Mesnil Saint Denis (FR)

(72) Inventors: Geoffroy Capoulun, Versailles (FR); Morgan Le Goff, Epinay-sur-Orge (FR); Alain Farkh, Montfort l'amaury (FR)

(73) Assignee: Valeo Systemes Thermiques, Le Mesnil Saint Denis (FR)

( * ) Notice: Subject to any disclaimer, the term of this patent is extended or adjusted under 35 U.S.C. 154(b) by 154 days.

(21) Appl. No.: 15/335,976

(22) Filed: Oct. 27, 2016

(65) Prior Publication Data

US 2017/0120720 A1    May 4, 2017

(30) Foreign Application Priority Data

Oct. 29, 2015  (FR) .................................. 15 60362

(51) Int. Cl.
| | |
|---|---|
| *H02K 5/04* | (2006.01) |
| *H02K 5/20* | (2006.01) |
| *F04D 29/42* | (2006.01) |
| *F04D 29/62* | (2006.01) |
| *B60H 1/00* | (2006.01) |

(52) U.S. Cl.
CPC ........... *H02K 5/04* (2013.01); *B60H 1/00471* (2013.01); *F04D 29/4226* (2013.01); *F04D 29/626* (2013.01); *H02K 5/20* (2013.01); *B60H 1/00521* (2013.01); *B60H 1/00564* (2013.01)

(58) Field of Classification Search
CPC ........ H02K 5/04; H02K 5/20; B60H 1/00521; B60H 1/00564
USPC ...................................... 310/89, 91
See application file for complete search history.

(56) References Cited

U.S. PATENT DOCUMENTS

| | | | | |
|---|---|---|---|---|
| 5,932,942 A  * | 8/1999 | Patyk | ..................... | H02K 11/33 310/58 |
| 8,659,193 B2 * | 2/2014 | Yamasaki | .............. | H02K 11/33 310/64 |
| 2001/0026107 A1* | 10/2001 | Uruma | .................... | F04D 25/06 310/91 |
| 2007/0177996 A1* | 8/2007 | Chapman | ........... | B60H 1/00471 417/370 |
| 2009/0058203 A1* | 3/2009 | Pettitt | ................. | F04D 25/0606 310/51 |
| 2011/0031830 A1* | 2/2011 | Oleson | .................... | F04D 13/06 310/88 |
| 2011/0254393 A1* | 10/2011 | Yamasaki | ................ | H02K 5/18 310/64 |

(Continued)

*Primary Examiner* — John K Kim
(74) *Attorney, Agent, or Firm* — Osha Liang LLP (57) ABSTRACT

A motor support unit designed to be mounted on a shell of a heating, ventilation and/or air-conditioning installation is disclosed. Additionally, the motor support unit includes a motor and a motor support. The motor support unit further includes a connection piece for fitting on the motor support and may also be intended for fitting on the shell in such a manner as to form an interface between the motor support and the shell. Furthermore, the connection piece and the motor support are formed by two distinct pieces.

19 Claims, 3 Drawing Sheets

(56) References Cited

U.S. PATENT DOCUMENTS

| | | | | |
|---|---|---|---|---|
| 2012/0112584 | A1* | 5/2012 | De Filippis | H02K 3/522 310/71 |
| 2015/0214865 | A1* | 7/2015 | Zhao | H02K 5/04 700/276 |
| 2015/0381006 | A1* | 12/2015 | Allen | H02K 1/148 417/423.7 |
| 2017/0120720 | A1* | 5/2017 | Capoulun | B60H 1/00521 |

* cited by examiner

MOTOR SUPPORT UNIT AND HEATING, VENTILATION AND/OR AIR CONDITIONING INSTALLATION FOR A CORRESPONDING MOTOR VEHICLE

BACKGROUND

The invention relates to the field of ventilation, heating and/or air-conditioning installations. The invention relates in particular to a motor support unit for an installation of this type.

A heating, ventilation and/or air-conditioning installation for a vehicle, particularly a motor vehicle, is generally used to distribute air in the passenger compartment of the vehicle.

In an installation of this type, the circulating airflow is propelled by a motorized fan assembly, also called a blower, which is mounted on the casing of the heating, ventilation and/or air-conditioning installation on a shell of the casing channelling the flow of air generated by the motorized fan assembly. The motorized fan assembly comprises, in particular, a fan wheel housed in the shell for generating a flow of air therein, and a motor support unit comprising an electric motor capable of rotating the fan wheel and a motor support. Conventionally, the motor is controlled by a control module.

The motor support is generally secured to the casing of the heating, ventilation and/or air-conditioning installation. According to a known solution, the motor support also carries the control module.

In general, it is the motor support that makes it possible to mount the motor support unit on the casing of the heating, ventilation and/or air-conditioning installation, more precisely on the shell.

The motor support thus forms a cap covering an opening of the shell on a side thereof.

The motor support is thus critical in terms of the incorporation of the motor support unit into the installation and must meet a number of requirements such as, in particular, it must provide a seal against the risk of water ingress, it must offer an aeraulic performance, and it must comply with an envisaged in-vehicle acoustic noise level.

It is also known to provide, on the motor support, one or more cooling channels conveying a flow of cooling air preferably taken from inside the shell and conveyed towards the motor and, advantageously, also towards the control module of the motor. Thus, the motor support has, furthermore, to meet a requirement for cooling the motor and/or the control module.

Depending on the type of heating, ventilation and/or air-conditioning installation, the casing and, in particular, the shell, may be of different design. It is thus necessary to adapt, in particular, the motor support designed to be affixed to the shell.

Thus, provision may be made for vehicles to be available both in right-hand drive format, that is to say with the steering wheel on the right, and also in left-hand drive format, that is to say with the steering wheel on the left, and the steering column is in this case likely to be arranged differently and thus the arrangement of the elements under the bonnet is generally modified. This requires provision to be made for motorized fan assemblies that are specifically adapted to the particular drive version.

According to known solutions, the motorized fan assembly, and in particular the motor support unit, is designed specifically for each application. There is no standard motorized fan assembly or standard motor support unit.

As a result, it is necessary, for each type of heating, ventilation and/or air-conditioning installation, to adapt, in particular, the motor support unit of the motorized fan assembly. In particular, the motor support, which allows, inter alia, the motor support unit to be fitted on the shell of the heating, ventilation and/or air-conditioning installation casing in the motor vehicle, must be modified.

In point of fact, redesigning and/or modifying the pieces of the motorized fan assembly may prove to be time-consuming, particularly in the case of the motor support, which is a multi-function and thus complex piece.

This gives rise to constraints and requires the motor support unit for the motorized fan assembly to be designed exclusively in accordance with a specific choice pre-defined as a function of the motor manufacturer's requirements.

SUMMARY OF DISCLOSURE

The object of the invention is thus to at least in part remedy these prior art problems by proposing a motor support unit for which fitting to the vehicle, for example on a shell of a heating, ventilation and/or air-conditioning installation, may be adapted in a simple manner in accordance with the motor manufacturer's requirements.

To that end, the subject of the invention is a motor support unit, for a heating, ventilation and/or air-conditioning installation, particularly for a motor vehicle, designed to be mounted on a shell of the heating, ventilation and/or air-conditioning installation, the motor support unit comprising:
 a motor, and
 a motor support,
 characterized in that it further comprises a connection piece, on the one hand, fitted on the motor support and, on the other hand, intended for fitting on the shell in such a manner as to form an interface between the motor support and the shell, the connection piece and the motor support being two distinct pieces.

The motor is, in particular, a brushless motor, also known as a self-controlled permanent magnet synchronous generator.

The connection piece thus allows an adaptation of the motor support unit to suit the application. Indeed, it is possible to achieve several configurations of the motor support unit and thus of the motorized fan assembly comprising a motor support unit of this type that differ from one another in terms of the connection piece. Thus, depending on the heating, ventilation and/or air-conditioning installation, it is the connection piece that varies whereas the other elements may be the same from one configuration to another and thus be standardized.

It is thus no longer imperative to design a motor support specific to each application.

This results in a reduced cost of manufacture of the motor support unit and a time saving in terms of adaptation to various heating, ventilation and/or air-conditioning installations. In particular, one consequence is a standardization of the most complex pieces, such as the motor support and the support of the control module. Depending on the context and on production volumes, this standardization may lead to reduced production costs.

This results in a reduction of the costs and of the time of development of an application, which may be an advantage in the case of a retrofit project (i.e. replacement of a product already in production).

Said motor support unit may, furthermore, comprise one or more of the following features, taken separately or in combination.

According to one aspect of the invention, the connection piece has a first face facing the motor support and a second, opposite face designed for interacting with the shell.

On the side of the motor support, the first face of the connection piece may remain the same from one configuration of the motor support unit to another in that it is designed for fitting with the motor support, which may be a standard piece.

On the other hand, the adaptation occurs on the second face of the connection piece, which is designed for fitting on the shell of the casing of the heating, ventilation and/or air-conditioning installation and is thus capable of being changed in accordance with the application. It suffices to adapt the design, otherwise known as the conception, of the second face designed to act as interface with the shell and, in particular, with a fan wheel housed in the shell, for each application.

According to another aspect of the invention, the second face of the connection piece has a substantially smooth surface. Thus, the design of the second face of the connection piece is optimized in order to correspond to an enhanced interface with the airflow, i.e. so as to reduce the risk of disturbance of the airflow in the shell.

According to a preferred embodiment, the connection piece comprises at least one portion for guiding a flow of cooling air, which has an air inlet on the second face and opens out on the first face.

The or each portion for guiding the flow of cooling air is designed to be traversed by a flow of cooling air coming from the shell in such a manner as to circulate the flow of cooling air in the motor support unit in order to cool the elements carried by the motor support, namely the motor and/or a control module capable of controlling the motor and likewise mounted on the motor support.

It is thus the connection piece that incorporates the function of cooling the motor, in particular, and no longer the motor support as in prior art solutions. The motor support may thus be simplified.

According to another aspect of the invention, the connection piece has a central axis and the first and second faces extend in planes that are parallel to one another and perpendicular to the central axis.

According to a particular embodiment, the connection piece has at least one flange arranged radially on the exterior of the reception zone of the motor support and comprising said at least one portion for guiding the flow of cooling air.

The motor and the connection piece are coaxial.

The motor support and the connection piece on the one hand and the connection piece and the shell housing the fan wheel on the other hand are fitted on the same axis.

Advantageously, the connection piece is made from plastics. This allows a simple, inexpensive embodiment for a connection piece of this type, which performs several functions, particularly that of mounting the motor support unit on the shell, that of interface between the motor support and the shell, and that of guiding a flow of cooling air in order to cool the motor, in particular.

According to one embodiment, the motor support unit comprises a control module of the motor and a support of the control module fitted on the motor support, the control module being arranged on the support of the control module on the side opposite the motor support. The unit formed by the control module, the support of the control module and the motor support is fitted on the connection piece.

The support of the control module advantageously acts as a bearing support for the motor.

Thus, the entire block formed by the control module, the support of the control module, the motor and the motor support may be fitted on the shell via the connection piece. Consequently, all these elements may be standard elements, irrespective of the heating, ventilation and/or air-conditioning installation into which the motor support unit has to be incorporated.

The invention also relates to a motorized fan assembly of a heating, ventilation and/or air-conditioning installation, the motorized fan assembly comprising a motor support unit as defined previously and a fan wheel capable of being driven by the motor of the motor support unit.

According to one aspect of the invention, when the motorized fan assembly is mounted in the heating, ventilation and/or air-conditioning installation, the connection piece is designed to be interposed between the motor support and the fan wheel.

The connection piece thus forms an interface between the motor support and the fan wheel designed to be driven by the motor and to be received in the shell in such a manner as to move an airflow in the latter.

According to one aspect of the invention, the second face of the connection piece opposite the first face arranged facing the motor support is arranged facing the fan wheel when the motor support unit is mounted in the heating, ventilation and/or air-conditioning installation.

Advantageously, the second face of the connection piece has a form that complements the form of the fan wheel in such a manner as to allow fitting by interaction of form between the connection piece and the fan wheel housed in the shell.

According to one embodiment, the second face of the connection piece has a substantially flat form.

According to another embodiment, the second face of the connection piece has an annular form that is substantially domed towards the fan wheel.

The invention likewise relates to a heating, ventilation and/or air-conditioning installation for a motor vehicle, which is characterized in that it comprises a shell and at least one motor support unit as defined previously mounted on the shell.

Only the connection piece of the motor support unit can change as a function of the heating, ventilation and/or air-conditioning installation, all the other elements of the motor support unit potentially being standard elements. This allows rapid adaptation since one single piece, the connection piece, has to be designed specifically to allow integration into the heating, ventilation and/or air-conditioning installation, and also a time saving.

For example, the connection piece may be designed in order to allow the mounting of the motor support unit, and, in particular, of the motorized fan assembly comprising this motor support unit, in a heating, ventilation and/or air-conditioning installation not only in a vehicle adapted for left-hand drive but also a vehicle adapted for right-hand drive.

According to one aspect of the invention, the shell has an opening on a side of the shell opposite an intake of an airflow and the motor support unit is arranged on the shell in such a manner as to cover the opening in the shell.

Thus, once mounted on the shell and, in particular, on the fan wheel housed in the shell, the motor support unit, via the connection piece, is able to move the airflow inside the shell and the blown airflow is guided towards an outlet from the shell that opens out, advantageously, in an air conduit of the heating, ventilation and/or air-conditioning installation.

According to an additional aspect of the invention, the connection piece comprises a substantially cylindrical skirt and a collar on the periphery of said skirt. The collar of the connection piece is arranged facing the periphery of the fan wheel, when the motor support unit is mounted in said installation.

Further features and advantages of the invention will become more clearly apparent on reading the following description, which is given by way of non-limiting illustrative example, and the appended drawings

DETAILED DESCRIPTION

In these figures, identical elements bear the same reference numerals.

The following embodiments are examples. Although the description relates to one or more embodiments, this does not necessarily mean that each reference relates to the same embodiment or that the features apply only to one single embodiment. Simple features from different embodiments may likewise be combined in order to provide further embodiments.

In the description, certain elements may be marked with a "prime" symbol, meaning that, for example, a first element or a second element may be mentioned. In such a case, this "prime" symbol is simply to differentiate and to name elements that are similar but not identical. This "prime" symbol does not imply any priority of one element over another. Such denominations may easily be interchanged without departing from the scope of the present invention.

Figure 1:
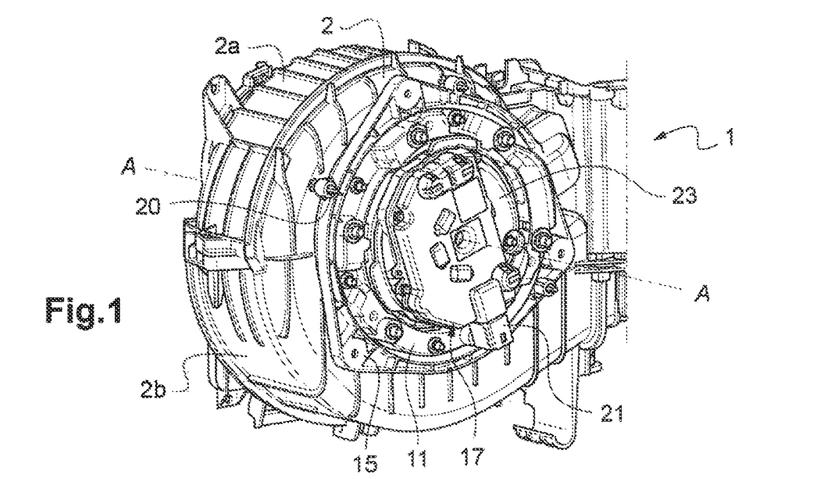
FIG. 1 is a perspective view of a motorized fan assembly comprising a motor support unit according to the invention mounted on a shell of a heating, ventilation and/or air-conditioning installation.

FIG. 1 shows a motorized fan assembly, also known as a blower, for a heating, ventilation and/or air-conditioning installation equipping, for example, a motor vehicle.

The motorized fan assembly comprises a motor support unit 1 designed to be mounted on a casing of the heating, ventilation and/or air-conditioning installation comprising, according to the embodiment described, a housing 2 in the form of a shell, hereinafter denoted by shell 2.

The shell 2 is, for example, formed substantially as a spiral. By way of non-limiting example, the shell 2 may be produced by the assembly of two half-shells 2a and 2b.

The motorized fan assembly is designed to be arranged in such a manner as to circulate an airflow in a conduit of the heating, ventilation and/or air-conditioning installation. The shell 2 is connected to this air conduit and allows the airflow blown by the motorized fan assembly to be conveyed into the air conduit. The air conduit of the heating, ventilation and/or air-conditioning installation distributes the airflow towards outlet openings (not shown) that open out in the vehicle passenger compartment.

More precisely, the motor support unit 1 of the motorized fan assembly is designed to be mounted on the shell 2, particularly at an opening on a side of the shell 2, advantageously opposite an intake for an airflow in the shell 2. This may be a flow of exterior air taken from outside the passenger compartment or a flow of air taken from inside the passenger compartment, known as recycled airflow, or, alternatively, a mixture of an exterior airflow and a recycled airflow.

The opening on the side of the shell 2 is thus closed by the motor support unit 1.

As may be seen better in FIGS. 2 and 3, the motor support unit 1 comprises a motor 3 and a motor support 11, described below.

The motorized fan assembly further comprises the motor support unit 1, a fan wheel 5 designed to be housed in the shell 2 and designed to be driven by the motor 3, in such a manner as to move the airflow in the shell 2. More precisely, an airflow is aspirated and circulated by the fan wheel 5, then extracted from the shell 2 via an outlet connected to the air conduit of the heating, ventilation and/or air-conditioning installation.

Regarding the motor 3, this is, in particular, a brushless motor 3 (also called a self-controlled permanent magnet synchronous generator). The motor 3 comprises a fixed stator and a rotor that can move relative to the stator and is capable of driving the fan wheel 5.

The motor is arranged around a longitudinal axis A, which corresponds to the axis of rotation of the motor 3. The motor 3 comprises a transmission shaft 4 extending along the longitudinal axis A. The transmission shaft 4 is, for example, arranged substantially in the centre of the motor 3. In this example, the transmission shaft 4 projects from the motor 3, thus having a free end.

The motor 3 and the fan wheel 5 are, here, coaxial.

The fan wheel 5 is mounted on the transmission shaft 4 of the motor 3.

Figure 2:
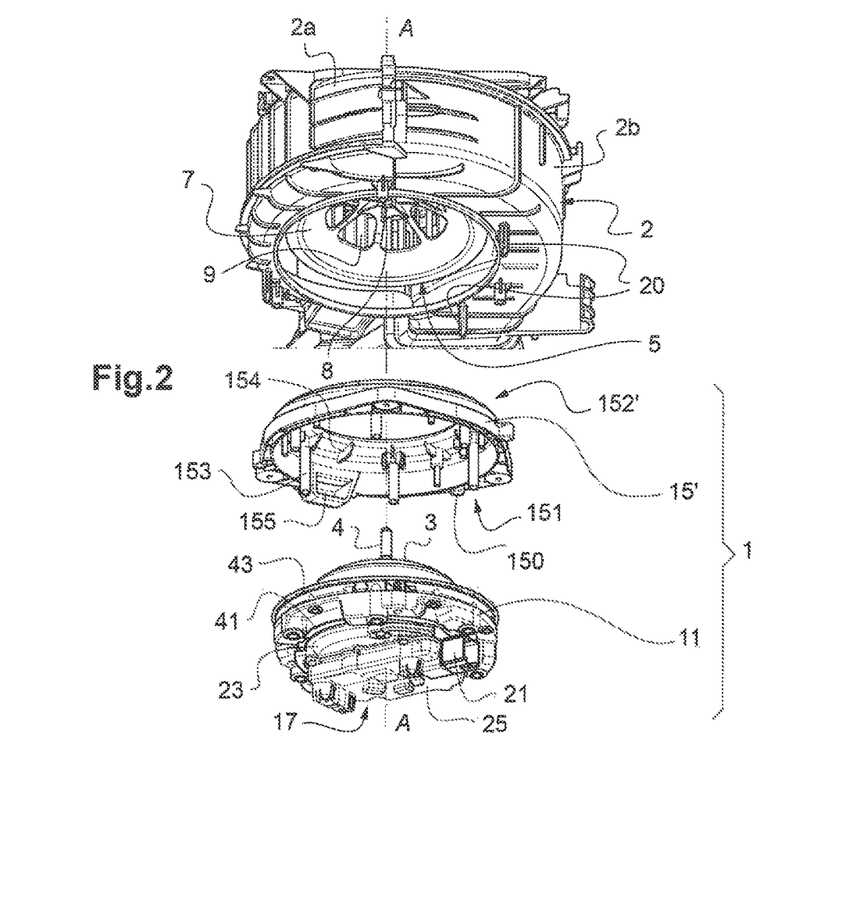
FIG. 2 is an expanded view of a motor support unit according to the invention and of a shell of a heating, ventilation and/or air-conditioning installation.

According to the particular illustrative embodiment illustrated in FIG. 2, the fan wheel 5 has, meanwhile, at least one part 7 having a substantially bowl-like form, and this part will henceforth be denoted by bowl 7. The bowl 7 is of substantially concave form. With reference to FIG. 2, the concavity of the bowl 7 is oriented towards the interior of the shell 2, when the motor support unit 1 is mounted on the shell 2. Furthermore, according to the particular embodiment illustrated in FIG. 4 or 5, the fan wheel 5 has a flat formed at the periphery of the bowl 7, on the side designed to interact with the motor support unit 1, as will be detailed below. In other words, the bowl 7 ends in this flat. The flat extends, in this example, substantially orthogonally relative to the axis A.

With reference, again, to FIG. 2, the fan wheel 5 comprises, moreover, a central hub 8 for receiving the free end of the transmission shaft 4 of the motor 3. The fan wheel 5 may furthermore have a substantially cylindrical general form, comprising blades or fins 9 that extend, in this example from the periphery of the bowl 7, in a direction that is substantially parallel to the longitudinal axis A of the motor 3. In other words, according to the particular embodiment illustrated in FIGS. 4 and 5, the blades or fins 9 extend away from the flat at the periphery of the bowl 7 and substantially orthogonally relative to this flat.

As stated previously, the motor support unit 1 further comprises a motor support 11.

According to the embodiment illustrated in FIGS. 1 and 2, the motor support 11 has a substantially circular general form.

The motor support 11 is, for example, made from plastics.

Once the motor support unit 1 has been fitted on the shell 2, the motor support 11 projects laterally on the side of the shell 2, as can be better seen in FIG. 1.

The side of the shell 2 that has the opening covered by the motor support unit 1, in particular by the motor support 11, extends, for example, in a plane perpendicular to the axis A.

In order to allow the motor support 11 to be fitted on the shell 2, the motor support unit 1 further comprises a connection piece 15 or 15' interposed between the motor support 11 and the shell 2. The connection piece 15 or 15' is arranged such as to form the join between the motor support 11 on the one hand and the shell 2 designed to house the fan wheel 5 on the other.

FIG. 1 shows a motor support unit 1 with a connection piece 15 according to a first embodiment and FIG. 2 shows a motor support unit 1 with a connection piece 15' according to a second embodiment.

This connection piece 15, 15' may be adapted according to requirements. Indeed, as indicated diagrammatically in FIG. 3, depending on the heating, ventilation and/or air-conditioning installation in which the motor support unit 1 has to be incorporated, one and the same motor support 11 may be fitted to a different connection piece 15 or 15'.

Figure 3:
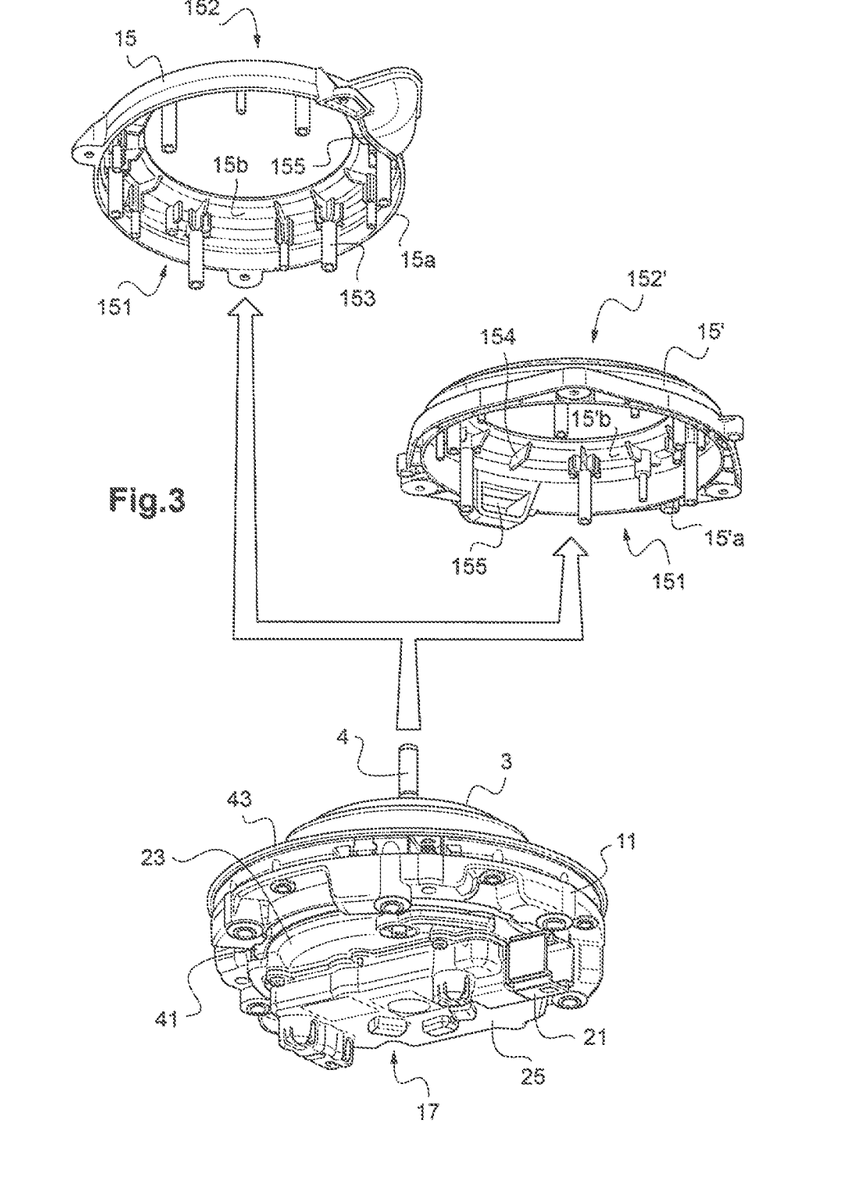
FIG. 3 shows standard elements of the motor support unit of FIG. 1 or 2 that can be fitted without distinction with a connection piece according to a first or a second embodiment.

The connection piece 15 illustrated in FIGS. 1 and 3 may, for example, be adapted for a shell 2 of a first type of heating, ventilation and/or air-conditioning installation whilst the connection piece 15' illustrated in FIGS. 2 and 3 may, for example be adapted for a shell 2 of a second type of heating, ventilation and/or air-conditioning installation. Mention may be made, by way of non-limiting example, of types of heating, ventilation and/or air-conditioning installation which differ: a heating, ventilation and/or air-conditioning installation configured for a left-hand drive vehicle or a heating, ventilation and/or air-conditioning installation configured for a right-hand drive vehicle.

The connection piece 15 or 15' thus forms an interface between, on the one hand, the motor support 11 and, on the other hand, the shell 2 and the fan wheel 5 housed in the shell 2 when the motor support unit 1, and in particular the motorized fan assembly, is fitted on the housing of the heating, ventilation and/or air-conditioning installation.

This connection piece 15, 15' may be produced from plastics, such as polypropylene, for example, in a simple and inexpensive way.

The connection piece 15, 15' has a central axis that, in this example, merges with the longitudinal axis A of the motor 3. In other words, the motor 3 and the connection piece 15, 15' are arranged about one and the same axis A and are thus coaxial.

The connection piece 15, 15' is fitted on the shell 2 on a fitting axis merged with the central axis of the connection piece 15, 15' and the longitudinal axis A of the motor 3. Similarly, the motor support 11 is fitted to the connection piece 15 on the same fitting axis merged with the central axis of the connection piece 15, 15' and the longitudinal axis A of the motor 3.

The connection piece 15, 15' is, here, designed to be affixed to the periphery of the opening in the shell 2. Affixing may be achieved by any appropriate means, for example by screwing. According to the example illustrated, the shell 2 may have fastening studs 20 that project from the shell 2, extending axially, in this example substantially parallel to the axis A, and designed to engage in and to traverse associated, complementary holes 150 provided on the connection piece 15, 15'.

In order to allow the mounting of the connection piece 15, 15' on the shell 2, the connection piece 15 or 15' has a general form that complements the form of the shell 2. More precisely, the connection piece 15 or 15' has a form that complements the form of the interior surface defined by the shell 2.

Figure 4:
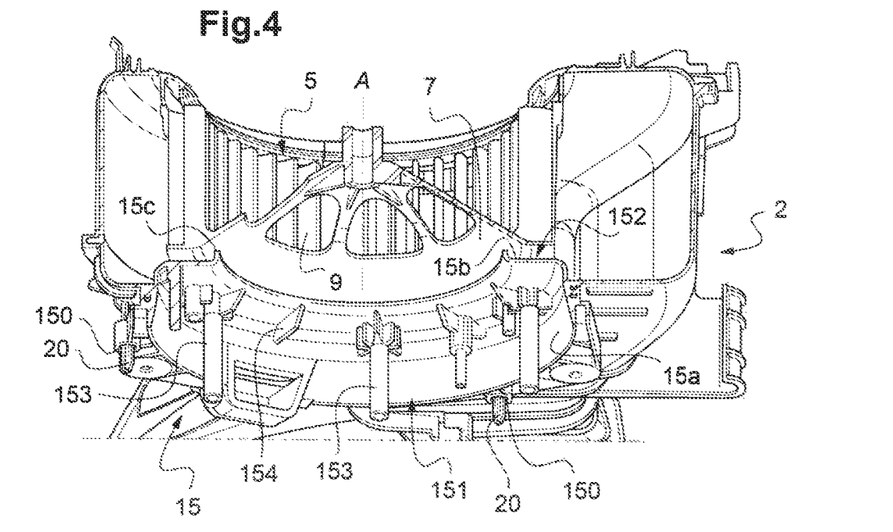
FIG. 4 is an enlarged first partial view of a part of a connection piece of the motor support unit of FIG. 1 or 2 fitted to a shell of a heating, ventilation and/or air-conditioning installation.
Figure 5:
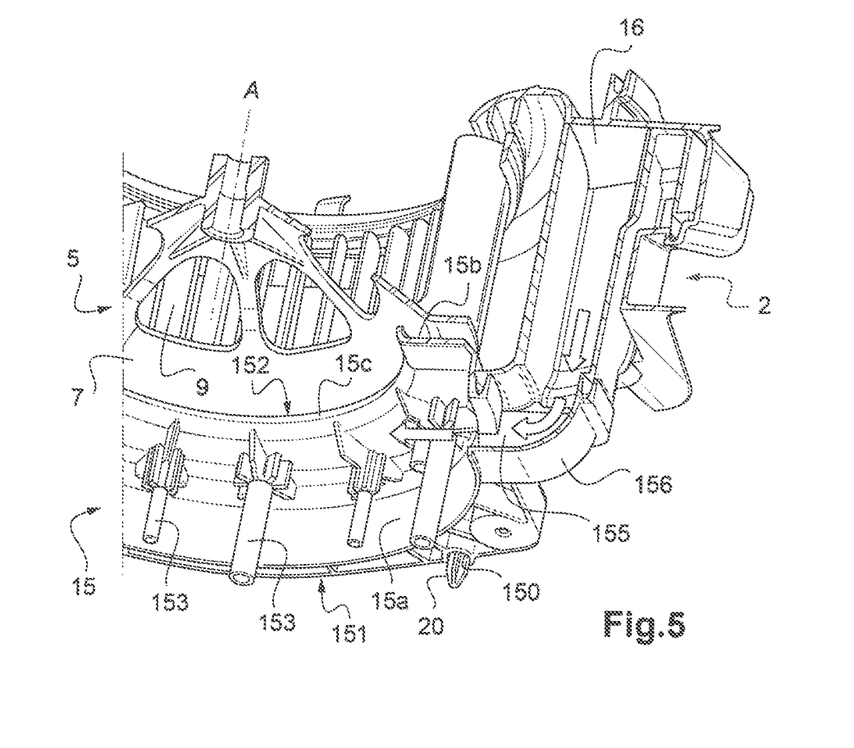
FIG. 5 is an enlarged second partial view of a part of a connection piece of the motor support unit of FIG. 1 or 2 fitted to a shell of a heating, ventilation and/or air-conditioning installation, showing a portion for guiding a flow of cooling air provided on the connection piece.

By way of example, as illustrated in FIGS. 3 to 5, the connection piece 15 or 15', respectively, has a substantially cylindrical skirt 15a or 15'a, respectively. The axis of revolution of the cylindrical skirt 15a or 15'a is, according to the example described, the axis A.

The cylindrical skirt 15a or 15'a, respectively, is capable of coming to bear against an interior wall of the shell 2 when the motor support unit 1 is mounted in the heating, ventilation and/or air-conditioning installation.

With reference to the arrangement of the elements in FIGS. 3 to 5, the cylindrical skirt 15a or 15'a, respectively, here forms a lower part of the connection piece 15 or 15', respectively.

The connection piece 15 or 15', respectively, further has, according to the illustrative embodiments of FIGS. 3 to 5, a collar 15b or 15'b, respectively, at the periphery of the cylindrical skirt 15a or 15'a, respectively, on the side of the connection piece 15 or 15', respectively, designed to be fitted on the shell 2. More precisely, the collar 15b or 15'b, respectively, is designed to be arranged facing the fan wheel 5 when the motor support unit 1 is mounted in the heating, ventilation and/or air-conditioning installation. In particular, the collar 15b or 15'b, respectively, is, for example, capable of being arranged facing the flat at the periphery of the bowl 7 of the fan wheel 5.

The collar 15b (cf. FIGS. 4 and 5) may extend substantially orthogonally relative to the cylindrical skirt 15a. The collar 15b may be substantially flat.

In a variant, provision may be made for the collar to have a form that is substantially domed towards the shell 2 when the motor support unit 1 is mounted on the shell 2.

With reference to the arrangement of the elements in FIGS. 3 to 5, the collar 15b or 15'b, respectively, here forms an upper part of the connection piece 15 or 15', respectively.

Lastly, according to a particular embodiment, which can be seen in FIGS. 4 and 5, provision may be made for a projection 15c at the free end of the collar 15b. In this example, the projection 15c extends away from the cylindrical skirt 15a and from the collar 15b. The projection 15c may extend substantially orthogonally to the collar 15b. The projection 15c extends, here, substantially parallel to the axis A. In this case, the upper part of the connection piece 15 is in two pieces 15b and 15c.

Furthermore, the connection piece 15 or 15' has a first face 151 and a second face 152 or 152' opposite one another.

The first face 151 serves as interface with the motor support 11 and is provided in order to allow fitting with the motor support 11. The first face 151 is, for example, defined, in particular, by the face of the collar 15b or 15'b which is arranged facing the motor support 11.

The second face 152 or 152' is designed to form an interface with the shell 2 and is provided in order to allow fitting with the shell 2. The second face 152 or 152' is, for example, defined by the face of the collar 15b or 15'b which is arranged facing the flat at the periphery of the bowl 7 of the fan wheel 5 when the motor support unit 1 is mounted in the heating, ventilation and/or air-conditioning installation.

The two faces 151 and 152 or 151 and 152', respectively, are in mutually parallel planes perpendicular to the central axis A of the connection piece 15 or 15', respectively.

According to a preferred embodiment, on the side of the motor support 11 the first face 151 may be substantially the same, or even be standard, that is to say it may remain unchanged over various embodiments of the connection piece 15, 15'. On the other hand, the second face 152, 152' on the side of the shell 2 may be different according to the embodiments, since it is this second face 152, 152' that is changed in order to allow adaptation to various shells 2 as a function of the heating, ventilation and/or air-conditioning installation into which the motor support unit 1 has to be incorporated.

The motor support 11 may thus be a standard piece irrespective of the heating, ventilation and/or air-conditioning installation and only the connection piece 15, 15' and, more precisely, the second face 152 or 152' thereof, is adapted as a function of the requirements or demands connected with this installation.

In other words, the motor support 11 may be adapted without distinction to any shell 2 whatsoever for any heating, ventilation and/or air-conditioning installation whatsoever by means of a connection piece 15 or 15' which is defined as a result. With one and the same standard motor support 11 it is possible to achieve configurations for the motor support unit 1 and thus of the motorized fan assembly that differ from one another in terms of the connection piece 15, 15'.

Advantageously, on the side of the shell 2 and of the fan wheel 5, the connection piece 15 or 15' is designed with as few roughnesses as possible. To achieve this, the second face 152, 152' has a substantially smooth surface, i.e. it is as far as possible devoid of irregularities, or, alternatively, of cavities. This makes it possible to reduce the generation of noise or of disruption to the airflow in the shell 2. This adaptation specific to the airflow in the shell 2 is more obviously made on the connection piece 15, 15' than on the motor support 11 which served as interface with the shell in the prior art solutions and was thus a very complex piece.

In particular, the second face 152, 152' of the connection piece 15, 15' is of a form that complements the form of the bowl 7 of the fan wheel 5.

According to an illustrative embodiment, the second face 152 of the connection piece 15 may be substantially flat.

In a variant, provision may be made for the second face 152' of the connection piece 15' to have a wall of annular form that is substantially domed towards the shell 2 or, here, towards the fan wheel 5, when the motor support unit 1 is mounted on the shell 2.

Furthermore, on the side of the motor support 11, the connection piece 15, 15' is, for example, designed to be affixed to the periphery of the motor support 11.

In order to allow the connection piece 15, 15' to be affixed to the motor support, the connection piece 15, 15' may have fastening pins 153 (better seen in FIG. 4) that project from the first face 151 and extend axially from the first face 151 towards the motor support 11. According to this example, the fastening pins 153 extend substantially parallel to the central axis A of the connection piece 15, 15'. The fastening pins 153 are designed to traverse associated holes in the motor support 11 at the time of fitting. In order to ensure a mechanical link between, on the one hand, the motor support 11 and the elements it carries and, on the other hand, the connection piece 15, 15', provision may be made to deform the fastening pins 153, for example by means of a heading process, after passage through the motor support 11. Naturally, any other appropriate means may be envisaged for fitting the connection piece 15, 15' to the motor support 11, in particular by screwing or, alternatively, by clipping. The fastening pins 153 are, for example, provided on the face of the collar 15b or 15'b arranged facing the motor support 11.

The connection piece 15 or 15', according to one or other of the embodiments illustrated in FIGS. 2 to 5, may furthermore comprise a plurality of stiffening ribs 154. The stiffening ribs 154 are, for example, provided on the face of the collar 15b or 15'b arranged facing the motor support 11.

Advantageously, the connection piece 15, 15' furthermore incorporates a function of cooling the motor 3.

More precisely, with reference to FIG. 5, the connection piece 15, 15' may comprise at least one portion 155 for guiding a flow of cooling air originating from the interior of the shell 2.

To that end, the or each portion 155 for guiding a flow of cooling air is arranged in aeraulic communication with the shell 2, more precisely with an air stream channel 16 provided on the shell 2, on the side of the shell 2 that carries the motor support unit 1 when the motor support unit 1 is fitted on the shell 2. According to the example illustrated, the stream channel 16 extends substantially parallel to the longitudinal axis A of the motor 3 merged with the central axis of the connection piece 15, 15'. The air stream channel 16 is, for example, of substantially cylindrical form. Naturally, any other form may be envisaged. Furthermore, the air stream channel 16 is arranged on the shell 2 on a part exterior to the opening receiving the fan wheel 5 of the motorized fan assembly, here in the vicinity of the periphery of the opening in the shell 2. More precisely, the air stream channel 16 is arranged radially at the exterior of the opening receiving the fan wheel 5.

In a complementary manner, the or each portion 155 for guiding a flow of cooling air comprises an air inlet provided on the second face 152, 152' of the connection piece 15, 15'. The air inlet has a form that complements the form of the air stream channel 16 of the shell 2, for example a substantially circular form. The guiding portion 155 is arranged such that the air inlet of the guiding portion 155 faces the air stream channel 16 of the shell 2. Here, the guiding portion 155 is provided on the periphery of the connection piece 15, 15' at the exterior of the zone designed to receive the motor support 11, more precisely on an edge zone radially at the exterior of the zone designed to receive the motor support 11.

Furthermore, the guiding portion 155 opens out on the first face 151 interfacing with the motor support 11, and more precisely opens out on the interior of the connection piece 15, 15' designed to receive the motor support 11. Thus, the flow of cooling air originating from the shell 2 that has traversed the air stream channel 16 of the shell 2 then the air inlet of the guiding portion 155 of the connection piece 15, 15' arrives on the interior of the connection piece 15, 15' on the side of the motor support 11. The motor support 11 is thus exposed to the flow of cooling air and consequently the elements carried by the motor support 11 are likewise exposed to this flow of cooling air. The motor 3 may thus be cooled by this flow of cooling air.

The flow of cooling air traversing the air stream channel 16 of the shell 2 and the guiding portion 155 of the connection piece 15, 15' is shown diagrammatically by arrows in FIG. 5.

According to the example illustrated in FIG. 5, the connection piece 15, 15' has a flange 156 on an edge zone radially to the exterior of the zone designed to receive the motor support 11. The flange 156 is designed to be fitted on the shell 2. The interior of this flange 156 is formed in such a manner as to have the guiding portion 155 designed to be traversed by the flow of cooling air originating from the shell 2.

The flange 156 may have a substantially elbowed part that makes it possible to guide the flow of cooling air that has traversed the air stream channel 16 of the shell 2 towards the interior of the connection piece 15, 15' on the side of the motor support 11.

Thus, effective cooling may be achieved by exposure of the motor 3 to the airflow prevailing in the shell 2. The motor support 11 has no need also to have a function of cooling the motor 3 and can thus be designed more simply than in the prior art solutions.

Advantageously, the motor support unit 1 further comprises a control module 17 of the motor 3. With reference to FIGS. 1 and 2, the control module 17 may comprise a control circuit, such as a printed circuit board (not shown), known by the English abbreviation PCB, supporting a set of electrical and/or electronic components allowing the motor 3 to be controlled. The control module 17 may further comprise at least one connector 21 designed to be connected to a wiring harness of the vehicle, in particular to supply energy and/or at least one control signal to the control circuit.

The motor support unit 1 may comprise a support 23 of the control module 17 on which the control module 17 is arranged. In other words, the control circuit and the connector 21 are carried by this support 23 of the control module 17. According to a preferred embodiment, the support 23 of the control module 17 also acts as hearing support for the motor 3.

According to the embodiment illustrated in FIGS. 1 and 2, the support 23 of the control module 17 has a substantially circular general form.

Furthermore, the motor support unit 1 may further comprise a cooling radiator, for example on the support 23 of the control module 17, for removing the heat produced by the electrical and/or electronic components carried by the control circuit 19. The support 23 of the control module 17 is advantageously produced from aluminium.

As an alternative or as a supplement, the flow of cooling air originating from the shell 2 that opens out via the guiding portion 155 of the connection piece 15, 15' may contribute to the cooling of the control module 17.

The control module 17 is arranged on the support 23 of the control module 17 on the side opposite the motor support 11. The control module 17 may be affixed by any appropriate means to the support 23 of the control module 17, for example by screwing.

Provision may furthermore be made for a protective cap 25 arranged over the control module 17 such as to cover the electrical and/or electronic components carried by the control circuit, and affixed to the support 23 of the control module 17.

The support 23 of the control module 17 is advantageously aligned with the motor support 11 on the longitudinal axis A of the motor 3 and is fitted on the motor support 11 on a fitting axis which is merged with the longitudinal axis A of the motor 3. The support 23 of the control module 17 may be fitted to the motor support 11 by any appropriate means, for example by screwing, riveting or heading.

Thus, all these elements, i.e. the control module 17 comprising, for example, a control circuit and one or more connectors 21, the support 23 of the control module 17 and the motor 3, are fitted on the motor support 11 in such a manner as to form a block that is in turn fitted on the fan wheel 5 and the shell 2 by means of the connection piece 15, 15'.

The motor support unit 1 may furthermore comprise at least one sealing means 41 that can better be seen in FIG. 2, arranged between the motor support 11 and the support 23 of the control module 17, and at least one sealing means 43 arranged between the motor support 11 and the connection piece 15, 15'.

The sealing means 41 or 43, respectively, is, for example, provided on the means for fastening between the motor support 11 and the support 23 of the control module 17 or the connection piece 15, 15', respectively. This makes it possible to prevent water ingress in particular. Provision may also be made for the sealing means 41, 43 to attenuate the transmission of vibrations from the motor 3 to the shell 2.

The sealing means 41, 43 is, for example, made from elastomeric material. The sealing means 41, 43 may be produced by overmoulding of the motor support 11.

Thus, a connection piece 15, 15' according to the invention makes it possible simply and inexpensively to adapt the motor support unit 1 and thus the motorized fan assembly as a function of the heating, ventilation and/or air-conditioning installation on which the motor support unit 1 and, more generally, the motorized fan assembly has to be incorporated.

Indeed, the connection piece 15, 15' is designed specifically according to the heating, ventilation and/or air-conditioning installation. This fitting of the motor support unit 1 on the heating, ventilation and/or air-conditioning installation is achieved by virtue of a first face 151 of the connection piece 15, 15', it being possible for this first face 151 to be standard, interfacing with the motor support 11, and by virtue of a second face 152, 152', designed specifically to form an interface with the shell 2.

The connection piece 15, 15' is a multi-function piece and, in particular, provides a function of mounting the motor support 11 on the shell 2, a function of interface with the motor support 11, and a function of interface with the shell 2 and the fan wheel 5 with as few roughnesses as possible so as to reduce the risk of noise generation, complying with aeraulic performance requirements. Other functions may also be provided by this connection piece 15, 15', such as the guiding of an airflow for cooling the motor 3 and/or the control module 17 for controlling the motor 3.

All these functions no longer have to be borne by the motor support 11, the design of which may be simplified.

Thus, irrespective of the heating, ventilation and/or air-conditioning installation into which the motor support unit 1, and thus the motorized fan assembly, has to be installed, there is no longer a need to modify the motor support 11, and this makes it possible to use a standard motor support 11 and as a result restricts costs of manufacture.

All the elements of the motor support unit 1 fitted on the shell 2 by means of the connection piece 15, 15' may be standardized, and only one face 152, 152' of the connection piece 15, 15' interfacing with the shell 2 and the fan wheel 5 has to be adapted to suit the application, which makes it possible to reduce costs of manufacture.

What is claimed:

1. A motor support unit, the motor support unit comprising:
   a motor;
   a motor support;
   a connection piece, fitted on the motor support to form an interface between the motor support and a shell of a heating, ventilation and/or air-conditioning installation, the connection piece and the motor support being two distinct pieces, wherein the connection piece comprises:
a first face facing the motor support, and
a second, opposite face for interacting with the shell, wherein the second face of the connection piece has a smooth surface; and
a control module of the motor and a support of the control module fitted on the motor support, the control module being arranged on the support of the control module on the side opposite the motor support, and
wherein the unit formed by the control module, the support of the control module and the motor support is fitted on the connection piece such that the control module is on an opposite end of the connection piece.

2. The motor support unit according to claim 1, wherein the connection piece comprises at least one portion for guiding a flow of cooling air, which has an air inlet on the second face and opens out on the first face.

3. The motor support unit according to claim 2, wherein the connection piece has at least one flange arranged radially on an exterior of a reception zone of the motor support and comprising said at least one portion for guiding the flow of cooling air.

4. The motor support unit according to claim 3, wherein the motor and the connection piece are coaxial.

5. The motor support unit according to claim 1, wherein the motor is a brushless motor.

6. The motor support unit according to claim 1, wherein fastening pins of the connection piece are coupled to holes of the motor support.

7. The motor support unit according to claim 1, wherein the control module comprises at least one connector configured to connect to a vehicle to supply energy and/or at least one control signal to the control module.

8. The motor support unit according to claim 1, further comprising at least one seal arranged between the motor support and the connection piece.

9. A motorized fan assembly of a heating, ventilation and/or air-conditioning installation for a motor vehicle, the motorized fan assembly comprising:
a shell;
at least one motor support unit mounted on the shell, the at least one motor support unit comprising:
a motor,
a motor support,
a connection piece, fitted on the motor support and the shell in such a manner as to form an interface between the motor support and the shell, wherein the connection piece comprises:
a first face facing the motor support,
a second face opposite to the first face for interacting with the shell, and
at least one portion for guiding a flow of cooling air, which has an air inlet on the second face and opens out on the first face,
wherein the connection piece is interposed between the motor support and a fan wheel housed in the shell such that the fan wheel moves an airflow in the shell; and
a control module of the motor and a support of the control module fitted on the motor support, the control module being arranged on the support of the control module on the side opposite the motor support,
wherein the unit formed by the control module, the support of the control module and the motor support is fitted on the connection piece such that the control module is on an opposite end of the connection piece.

10. The motorized fan assembly according to claim 9, wherein the fan wheel is driven by the motor.

11. The motorized fan assembly according to claim 9, wherein the connection piece comprises:
a cylindrical skirt, and
a collar at a periphery of said cylindrical skirt arranged facing a periphery of the fan wheel.

12. The motorized fan assembly according to claim 9, wherein the fan wheel comprises a concave bowl, wherein a concavity of the bowl is oriented towards an interior of the shell.

13. The motorized fan assembly according to claim 12, wherein the fan wheel comprises a plurality of blades or fins that extend from a periphery of the bowl in a direction that is parallel to a longitudinal axis of the motor.

14. The motorized fan assembly according to claim 10, wherein the fan wheel comprises a central hub for receiving a free end of a transmission shaft of the motor.

15. The motorized fan assembly according to claim 9, further comprising an air stream channel provided on a side of the shell, wherein the air stream channel carries the at least one motor support unit.

16. The motorized fan assembly according to claim 15, wherein the air stream channel extends parallel to a longitudinal axis of the motor.

17. The motorized fan assembly according to claim 16, wherein the connection piece comprises at least one portion for guiding a flow of cooling air, wherein the at least one portion is in aeraulic communication with the air stream channel.

18. The motorized fan assembly according to claim 17, wherein a flange directly connects the at least one portion to the air stream channel.

19. A motor support unit, the motor support unit comprising:
a motor;
a motor support;
a connection piece, fitted on the motor support to form an interface between the motor support and a shell of a heating, ventilation and/or air-conditioning installation, the connection piece and the motor support being two distinct pieces, wherein the connection piece comprises:
a first face facing the motor support,
a second, opposite face for interacting with the shell, and
at least one portion for guiding a flow of cooling air, which has an air inlet on the second face and opens out on the first face; and
a control module of the motor and a support of the control module fitted on the motor support, the control module being arranged on the support of the control module on the side opposite the motor support, and
wherein the unit formed by the control module, the support of the control module and the motor support is fitted on the connection piece such that the control module is on an opposite end of the connection piece.

* * * * *